(12) United States Patent
Clark

(10) Patent No.: US 10,874,259 B2
(45) Date of Patent: Dec. 29, 2020

(54) GLUELESS EXPANDABLE CUTTING BOARD

(71) Applicant: Culinary Woodcraft, LLC, Bainbridge Island, WA (US)

(72) Inventor: Paul V. Clark, Bainbridge Island, WA (US)

(73) Assignee: Culinary Woodcraft, LLC., Bainbridge Island, WA (US)

( * ) Notice: Subject to any disclaimer, the term of this patent is extended or adjusted under 35 U.S.C. 154(b) by 73 days.

(21) Appl. No.: 16/237,230

(22) Filed: Dec. 31, 2018

(65) Prior Publication Data

US 2019/0200811 A1 Jul. 4, 2019

Related U.S. Application Data

(60) Provisional application No. 62/612,705, filed on Jan. 1, 2018.

(51) Int. Cl.
*A47J 47/00* (2006.01)
(52) U.S. Cl.
CPC .................. *A47J 47/005* (2013.01)
(58) Field of Classification Search
CPC ............... A47J 47/00; A47J 47/005
See application file for complete search history.

(56) References Cited

U.S. PATENT DOCUMENTS

| 951,785 | A | * | 3/1910 | McQuinn | A47J 47/005 269/302.1 |
|---|---|---|---|---|---|
| 4,017,063 | A | * | 4/1977 | Brusich | A47J 47/005 269/302.1 |
| 4,204,451 | A | * | 5/1980 | Reichert | B26D 7/20 269/302.1 |
| 6,460,841 | B1 | * | 10/2002 | Durr | A47J 47/005 269/289 R |
| 2004/0046301 | A1 | * | 3/2004 | Thompson | A47J 47/005 269/289 R |
| 2012/0193858 | A1 | * | 8/2012 | Karalius | A47J 47/005 269/311 |

* cited by examiner

*Primary Examiner* — Tyrone V Hall, Jr.
(74) *Attorney, Agent, or Firm* — Athorus, PLLC

(57) ABSTRACT

A glue-less, configurable (and re-configurable) cutting board is presented. The configurable cutting board comprises a plurality of cutting board members that, when arranged together, interlock with each other and form a cutting board surface. The plurality of cutting board members is cinched together using tying members secured with securing flanges. This invention allows for any number of cutting board configurations using standard cutting board members without the thread of adulterating food with particles of glue. This invention further allows for easy replacement of cutting board members that are worn, broken or warped.

7 Claims, 5 Drawing Sheets

GLUELESS EXPANDABLE CUTTING BOARD

CROSS-REFERENCE TO RELATED MATTERS

This application claims the benefit of U.S. Provisional Patent Application No. 62/612,705, filed on Jan. 1, 2018, which is incorporated herein by reference.

BACKGROUND

This matter relates to cutting boards, specifically to wood cutting boards having means to allow a person/configurer to adjust the size and pattern of the cutting board.

Cutting boards are an essential part of the kitchen. Cutting boards provide a suitable surface where someone can prepare food using knives or other objects without damaging those knives or their countertops. Wood is a popular medium for cutting boards because wood is widely available and it is easy on knife edges, meaning that cutting an item on wood does not dull the edge of the knife as readily when compared cutting that item on a tile or stone countertop surface.

The main advantage of a wood cutting board surface compared to a "plastic" board cutting board surface, i.e., one made of polyurethane or HDPE, is that wood is able to "self-heal:" small cuts made on a wood surface close back up. This seal-healing represents a real and significant advantage in that it inhibits the harboring of bacteria in unhealed small cuts. Plastic cutting boards, after having been cut on, become laden with small cut marks and these cut marks allow places for bacteria to reproduce, thus creating an unsafe surface for food preparation. Obviously, food safety is a big priority in the kitchen where food is being handled and prepared. Having a cutting surface on which to cut and prepare food items for consumption that is considered "food safe" is essential in any kitchen.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
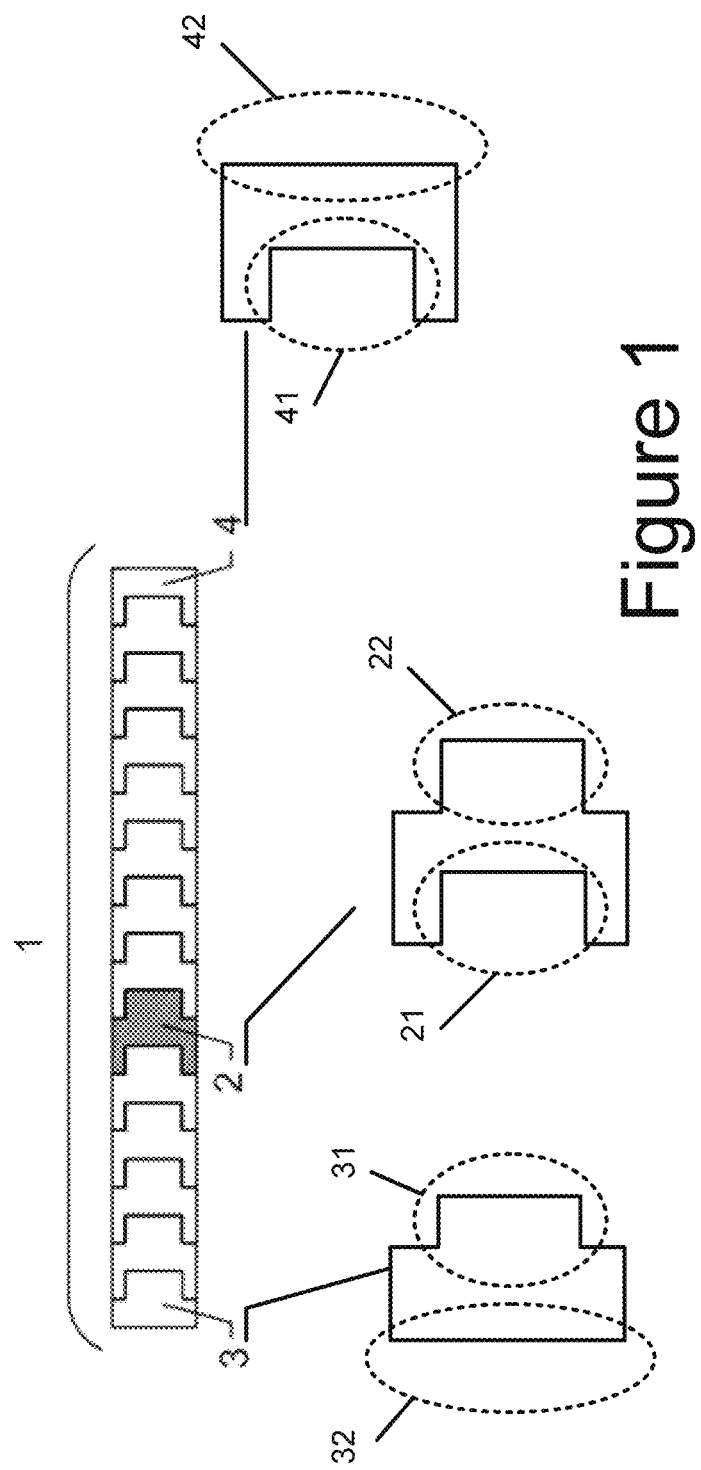
FIG. 1 is a pictorial diagram illustrating a view of the end of a cutting board constructed from a plurality of cutting board members in accordance with aspects of the disclosed subject matter.

Traditionally, wood cutting boards are made by laminating a plurality of strips of wood together using some type of glue or adhesive. There are two types of wood cutting boards: an end grain board where the end grain of the wood comprises the cutting surface, and an edge grain board where the grain of the wood runs parallel to the cutting surface. Both types of wood cutting boards leave glue joints exposed to the cutting surface.

Glue and/or adhesive, whether cured or uncured, is not considered a food safe material, meaning that it is not safe to consume or ingest. However, with typical wood cutting boards, during the food preparation process that involves cutting and/or chopping, it is feasible and often likely for pieces of glue to become dislodged from the cutting surface and mixed into the prepared food.

It should be further appreciated that many wood cutting boards are susceptible to warping when moisture is absorbed into one side of the wood cutting board more than is absorbed in the other side. When this happens the side of the cutting board that absorbs more moisture expands, and this expansion causes the cutting board to cup. This, of course, results in an unstable cutting surface when the cutting board is placed on a planar surface, such as a countertop.

According to aspects of the disclosed subject matter, rather that utilizing glue and/or adhesive to join wood slats as cutting board members to form a wood cutting board, an improved design is presented that beneficially and advantageously eliminates glue joints, allowing for the use of wood without the risk of small pieces being caught up in consumable foot. Further still, the disclosed subject matter enables a person/configurer to replace worn or warped slats of a suitably configured cutting board resulting from continuous chopping and/or cutting. This, advantageously, allows a person to remove and/or replace warping boards, thereby resulting in a stable cutting surface and an improved cutting board. Yet further, a wood cutting board configured according to the disclosed subject matter is strengthened and stiffened, resulting in increased resistance to warping and/or cupping even when its constituent members get wet. Other advantages will become apparent from a study of the following description and the accompanying drawings.

In operation, one uses a cutting board assembled in accordance with aspects of the disclosed subject matter in a typical manner. However, when desired, a person can disassemble a suitably configured cutting board, replace one or more cutting board members, add new cutting board members, and/or rearrange the cutting board members to re-constitute the cutting board.

According to aspects of the disclosed subject matter, cutting board members have a height, width and length. When joined together, as will be discussed below, the cutting board members form at least one plane, i.e., a smooth surface or top surface, that is suitable for use as a cutting surface of a cutting board. The cutting board members have a form that can interlock or engage with other members such that, when cinched together, the cutting board members are interlocked and do not move independently. While the cutting board members may be formed largely the same, there are typically two edge members, one for each side of the cutting board surface. These edge members are typically formed with interlocking features on one side only, with the opposite side being smooth such that the cutting board can be formed with a smooth side (perpendicular to the cutting board surface.)

Turning to FIG. 1, this figure is a pictorial diagram illustrating a view of the end of a cutting board 1 constructed from a plurality of cutting board members 2-4 in accordance with aspects of the disclosed subject matter. As shown in FIG. 1, in this illustrated, non-limiting embodiment, the cutting board members are generally formed to have both tongues and interlocking grooves, as shown with member 2, having both a groove portion 21 and a tongue portion 22 for interlocking with the cutting board members on either side. However, in this non-limited example, there are two distinct cutting board members which do not have both a tongue and groove portion. More particularly, edge member 3 has a flat side 32 corresponding to a side of the cutting board and a tongue portion 31 for interlocking with another cutting board member, and edge member 4 which has a groove portion 41 for interlocking with another member and a flat side which corresponds (when assembled with other cutting board members into a cutting board) to a side of the cutting board 1.

Figure 2:
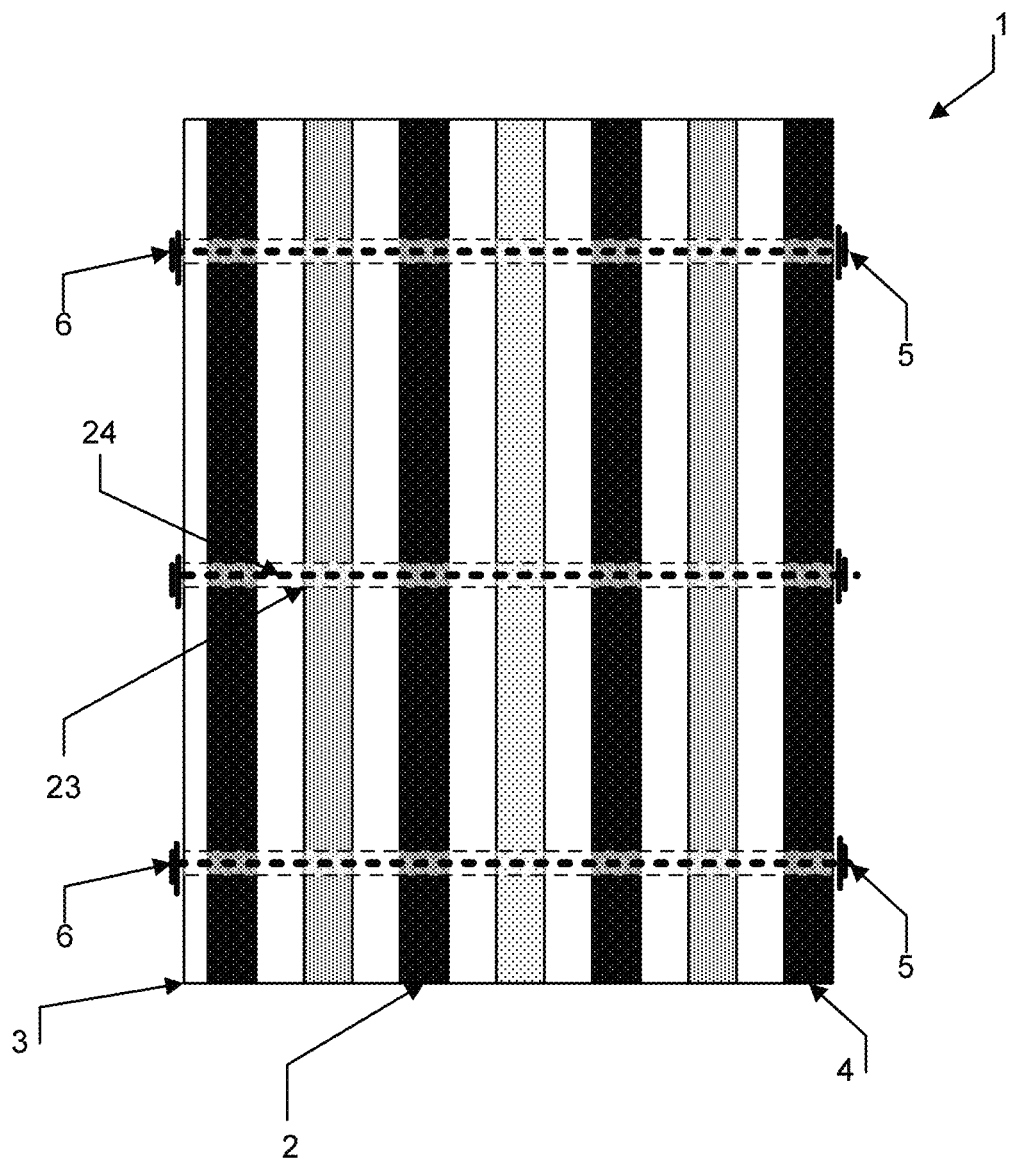
FIG. 2 is a pictorial diagram illustrating a top view of the cutting board and further illustrating the tying members that are used to keep the cutting board members pressed tightly together, in accordance with aspects of the disclose subject matter.
Figure 3:
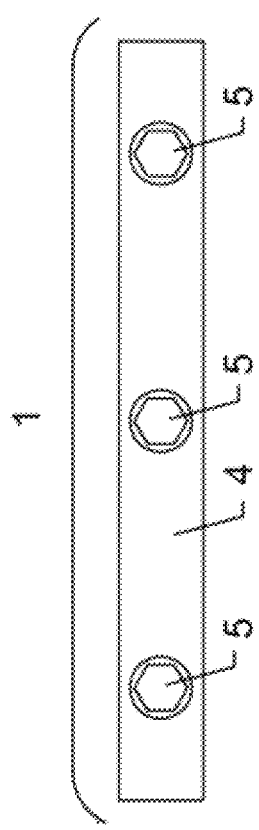
FIG. 3 is a pictorial diagram illustrating a side view of a cutting board constructed from a plurality of cutting board members in accordance with aspects of the disclosed subject matter.
Figure 4:
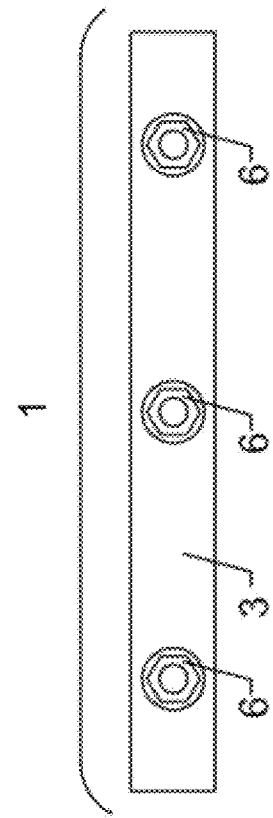
FIG. 4 is a pictorial diagram illustrating an alternative side view of a cutting board constructed from a plurality of cutting board members in accordance with aspects of the disclosed subject matter.

While the cutting board members are formed to interlock with one another, according to aspects of the disclosed subject matter, there are tying members that hold the assembled cutting board members tightly together. Turning to FIG. 2, FIG. 2 is a pictorial diagram illustrating a top view of the cutting board 1 and further illustrating the tying members that are used to keep the cutting board members pressed tightly together, in accordance with aspects of the disclose subject matter. More particularly, the tying members, such as tying member 24, are placed though aligned channels drilled through each of the cutting board members, such as channel 23. On either end of the tying member is a securing flange, such as securing flanges 25 and 26, which secure the cutting board members together by being attached to either end of the tying members. In one embodiment, the tying members are rods cut to a desired length such that the securing members can attach in a manner to cinch the cutting board members together. In this embodiment, the tying members/rods may have threading on either side and the securing flanges, such as securing flanges 5 and 6, may each comprise a nut and washer that screw onto the tying member and, in so doing, cinch together the cutting board members. Side views of the cutting board 1, as configured in FIG. 2, are shown in FIGS. 3 and 4. Additionally, while cutting board 1 is shown in FIG. 2 as having 3 channels drilled through the cutting board members, this is for illustration purposes and should not be viewed as limiting upon the disclosed subject matter. Indeed, two or even one channel may be used, as well as more than three channels. However, ideally there are at least two channels for securing the cutting board members together.

FIG. 3 is a pictorial diagram illustrating a side view of the cutting board 1 constructed from a plurality of cutting board members in accordance with aspects of the disclosed subject matter. As can be seen in FIG. 3, there are three securing flanges 5 that are visible in edge member 4 from this side view. While these securing flanges 5 are shown in FIG. 2 as extended beyond the side of the cutting board 1, in various embodiments, the cutting board may be configured such that the channels, such as channel 23, that are laterally drilled through the cutting board members have an opening that allows the securing flanges to sit within or flush to the side of the cutting board 1. As shown in FIG. 3, securing flanges on one side of the cutting board 1 may comprise caps that are permanently attached to a tying member, such as securing flanges 5.

FIG. 4 is a pictorial diagram illustrating an alternative side view of a cutting board 1 constructed from a plurality of cutting board members in accordance with aspects of the disclosed subject matter. As shown in in FIG. 4, the securing flanges 6 are counter-sunk into the edge member 3 such that they are flush or inside the side of the cutting board 1. Also, securing flanges 6 comprise a nut and washer and, in conjunction with the permanently attached securing flanges 5 of FIG. 3, cinch the cutting board members together, securing them together via the interlocking mechanisms of the members themselves.

Figure 5:
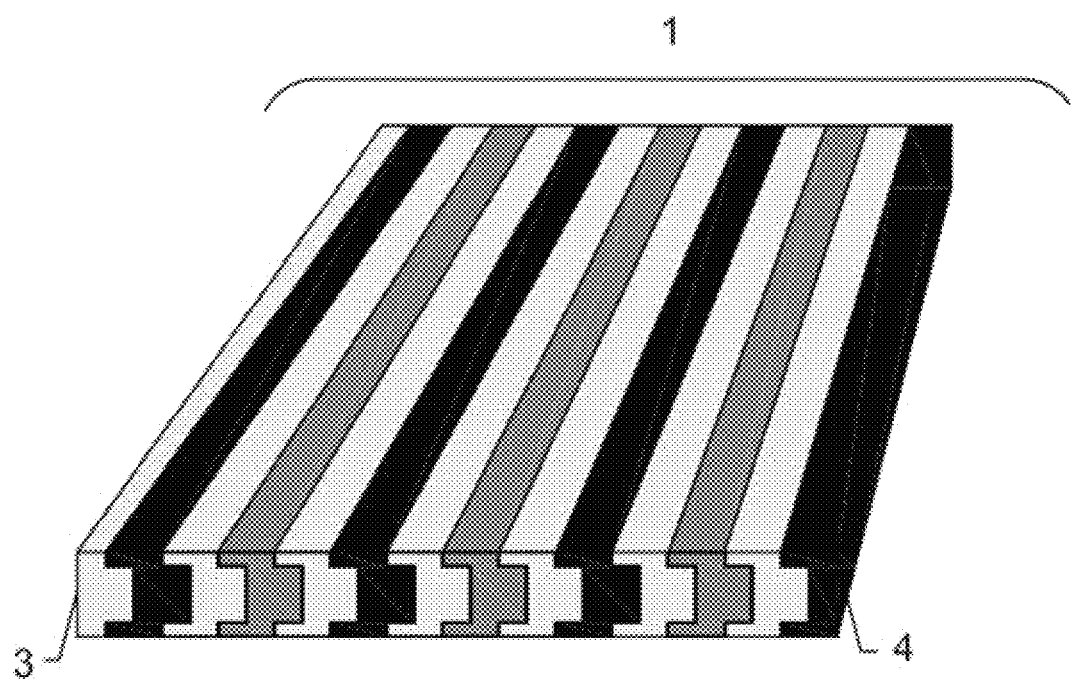
FIG. 5 is a pictorial diagram of a top view of a cutting board constructed from a plurality of cutting board members configured in accordance with aspects of the disclosed subject matter.

FIG. 5 is a pictorial diagram of a top view of a cutting board 1 constructed from a plurality of cutting board members, such as members 3 and 4, in accordance with aspects of the disclosed subject matter. In this illustrated embodiment, the securing flanges 5 and 6 are counter-sunk within the board and are not visible. This view also shows that the cutting board members may be of different color and/or type of wood and assembled to form various patterns that may be desired.

As mentioned above, in operation a person uses the suitable configured cutting board 1 in a normal manner. The person can also decide, when desired, to dissemble the cutting board 1 by loosening the securing flanges on at least one side, removing the tying members, rearrange the cutting board members in any manner, except leaving the edge members on either side, re-inserting the tying members, and re-securing the securing flanges. Additionally, the user can replace warping and/or worn out cutting board members (both middle and edge members) to repair the surface of the cutting board. Additionally or alternatively, the cutting board members may be flipped over and rotated such that the bottom surface of a cutting board member can then be used at the cutting board surface—thereby extending the useful life of each cutting board member. Shorter or longer tying members may be used to narrow or widen the cutting board by adding or removing cutting board members.

Figure 6:
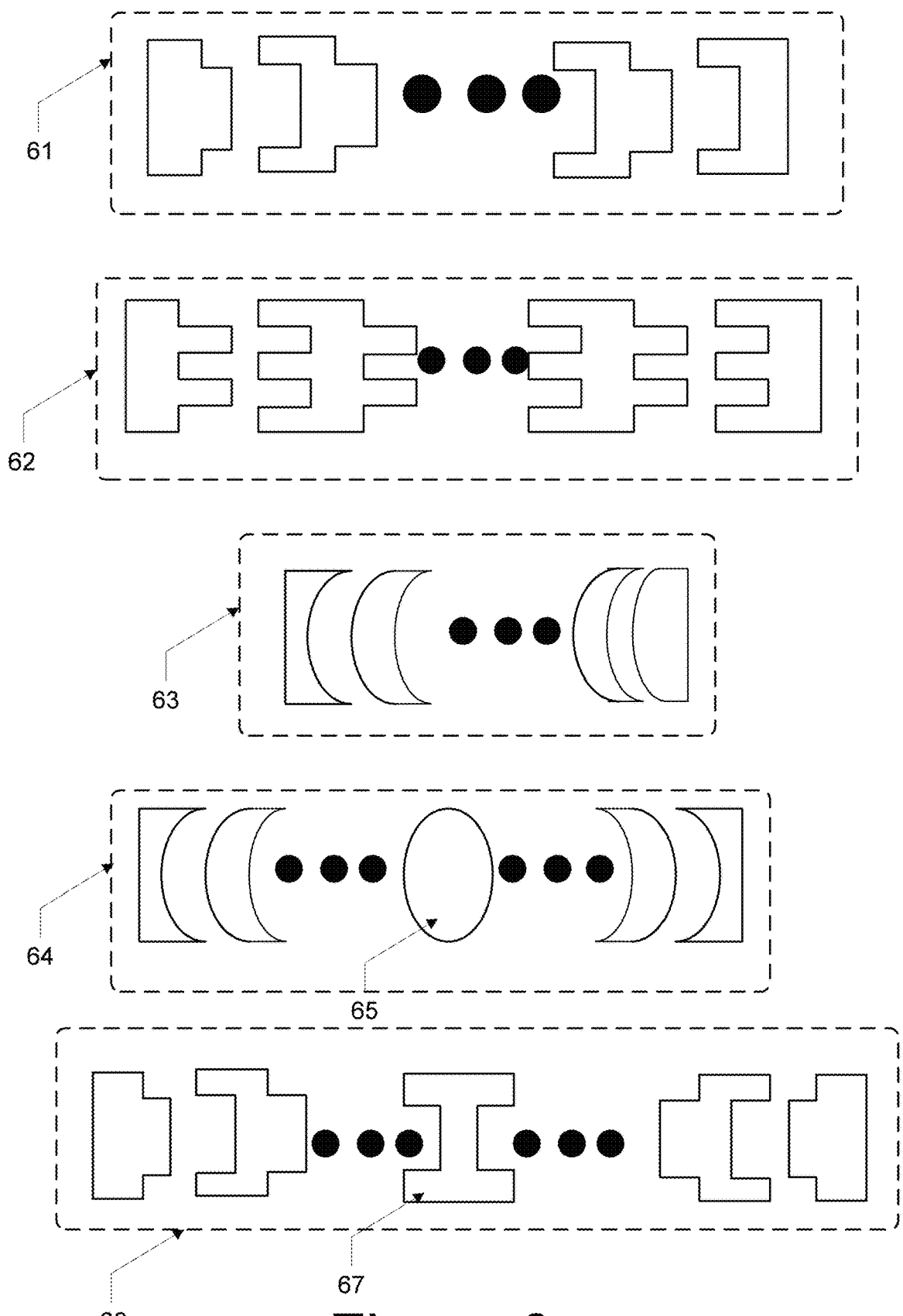
FIG. 6 is a pictorial diagram of embodiments of suitable cutting board member sets for forming a glueless cutting board, in accordance with aspects of the disclosed subject matter.

FIG. 6 is a pictorial diagram of embodiments of suitable cutting board member sets for forming a glueless cutting board, in accordance with aspects of the disclosed subject matter. Member set 61 shows the cutting board members as illustrated in FIG. 1, with the middle cutting board members having both a tongue and groove side, with an edge member for either side. Member set 62 is similar to the cutting board members of member set 61, except that the tongue and groove mechanism comprises multiple tongues/grooves on either side of the middle members, and the edge members are suitable configured to engage with multiple tongues/grooves.

Member set 63 shows that rounded sides can be used to engage with other members. These stay cinched and engaged with one another due to their rounded nature and the cinching force of the one or more tying members that also prevents individual upward or downward movement.

Member set 64 is similar to member set 63, except that a central member 65 also serves to "flip" the arrangement of the engaging features. In this example, the edge members are identical but horizontally flipped. Similarly, the middle members (except for the central member) are identical but horizontally flipped.

Member set 65 is similar to member sets 61 and 64 in that it uses the middle members of member set 61. It is similar to member set 64 in that it contains a central member 67 that flips the arrangement of engagement features. The middle members, except the central member 67, are identical but flipped horizontally. and the edge members are identical but horizontally flipped to either other.

While the above discussion as been made in regard to a consistent size and shape of the cutting board members, advantageous in facilitating easy manufacture of cutting board members, other sizes and/or shapes may be used so long as the cutting board members, when cinched together with one or more tying members can cinch the cutting board members together, forcing them to engage with each other. In various embodiments, the cutting board members may be of same widths or different widths, so long as the engaging features are aligned. The heights of the cutting board members can be different, so long as the drilling and cinching form at least one smooth cutting surface.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A configurable cutting board block suitable for use as a cutting board, comprising:
    a plurality of cutting board members, wherein each of the plurality of cutting board members are discrete and comprise:
        a height, a length and a width, and wherein the plurality of cutting board members are arranged in a plane along the widths of the cutting board members such that, when joined together in the plane, the plurality of cutting board members collectively form at least one smooth surface on one side of the plane;
    wherein the plurality of cutting board members further comprise an interlocking mechanism to interlock with adjacent cutting board members, wherein the interlocking mechanism of each cutting board member is formed on each member along the width of each cutting board member such that, when arranged along the plane and interlocked together, none of the plurality of members can move individually; and
    wherein the plurality of cutting board members further include a hole for one or more tying members, each hole allowing a tying member to pass through the cutting board member along the plane, and wherein each hole in each cutting board member is aligned with a corresponding hole in an adjacent cutting board member;
    wherein the one or more tying members comprising a length and size to pass through a hole in the plurality of cutting board members, and configured to allow securing flanges to be attached to an end of the one or more tying members, and further configured to allow adjustment to at least one securing flange on the end of the one or more tying members along the plane such that the plurality of cutting board members is cinched interlocked together along the plane.

2. The configurable cutting board block of claim 1, wherein the plurality of cutting board members includes two edge cutting board members, one edge cutting board member for either side of the plurality of cutting board members when arranged in the plane, and wherein each edge cutting board member includes the interlocking mechanism on one side of its width and has a smooth surface on another side of its width.

3. The configurable cutting board block of claim 2, wherein the plurality of cutting board members includes a central member that is configured to interlock with adjacent cutting board members and change the orientation of the interlocking mechanism of at least some of the plurality of cutting board members.

4. The configurable cutting board block of claim 1, wherein the interlocking mechanism is a tongue and groove configuration of the cutting board members.

5. The configurable cutting board block of claim 1, wherein the interlocking mechanism is a rounded configuration of the cutting board members.

6. The configurable cutting board block of claim 1 comprising at least three tying members.

7. The configurable cutting board block of claim 1, wherein at least one securing flange comprises a washing and a threaded nut.

* * * * *